United States Patent
Dupaquis et al.

(10) Patent No.: US 7,805,480 B2
(45) Date of Patent: *Sep. 28, 2010

(54) RANDOMIZED MODULAR POLYNOMIAL REDUCTION METHOD AND HARDWARE THEREFOR

(75) Inventors: Vincent Dupaquis, Biver (FR); Michel Douguet, Marseilles (FR)

(73) Assignee: Atmel Rousset S.A.S., Rousset Cedex (FR)

( * ) Notice: Subject to any disclaimer, the term of this patent is extended or adjusted under 35 U.S.C. 154(b) by 1171 days.

This patent is subject to a terminal disclaimer.

(21) Appl. No.: 11/203,939

(22) Filed: Aug. 15, 2005

(65) Prior Publication Data

US 2010/0023572 A1    Jan. 28, 2010

(30) Foreign Application Priority Data

May 12, 2005    (FR)    ..................... 05 04779

(51) Int. Cl.
G06F 7/72    (2006.01)
(52) U.S. Cl. .................................... 708/492
(58) Field of Classification Search ........................ None
See application file for complete search history.

(56) References Cited

U.S. PATENT DOCUMENTS

| | | | |
|---|---|---|---|
| 5,077,793 A | 12/1991 | Falk et al. | |
| 5,144,574 A | 9/1992 | Morita | |
| 5,185,711 A | 2/1993 | Hattori | 708/492 |
| 5,210,710 A | 5/1993 | Omura | 364/746.1 |
| 5,373,560 A | 12/1994 | Schlafly | 380/30 |
| 5,479,511 A | 12/1995 | Naccache | |
| 5,513,133 A | 4/1996 | Cressel et al. | |
| 5,724,279 A | 3/1998 | Benaloh et al. | |
| 5,764,554 A | 6/1998 | Monier | |
| 5,793,659 A | 8/1998 | Chen et al. | |

(Continued)

FOREIGN PATENT DOCUMENTS

WO    WO-2004111831 A2    12/2004

(Continued)

OTHER PUBLICATIONS

Jean-Francois Dhem, Efficient Modular Reduction Algorithm in $IF_q[x]$ and Its Application to 'Left to Right' Modular Multiplication in $IF_2[x]$, CHES 2003, LNCS 2779, pp. 203-213, 2003, XP-002358295, Berlin.

(Continued)

*Primary Examiner*—David H Malzahn
(74) *Attorney, Agent, or Firm*—Schwegman, Lundberg & Woessner, P.A.

(57) ABSTRACT

A cryptographically secure, computer hardware-implemented binary finite-field polynomial modular reduction method estimates and randomizes a polynomial quotient used for computation of a polynomial remainder. The randomizing error injected into the approximate polynomial quotient is limited to a few bits, e.g. less than half a word. The computed polynomial remainder is congruent with but a small random multiple of the residue, which can be found by a final strict binary field reduction by the modulus. In addition to a computational unit and operations sequencer, the computing hardware also includes a random or pseudo-random number generator for producing the random polynomial error. The modular reduction method thus resists hardware cryptoanalysis attacks, such as timing and power analysis attacks.

11 Claims, 2 Drawing Sheets

U.S. PATENT DOCUMENTS

| | | | |
|---|---|---|---|
| 5,870,478 A | 2/1999 | Kawamura | |
| 5,954,788 A | 9/1999 | Suh et al. | |
| 5,999,627 A | 12/1999 | Lee et al. | |
| 6,049,815 A | 4/2000 | Lambert et al. | 708/492 |
| 6,088,453 A | 7/2000 | Shimbo | |
| 6,091,819 A | 7/2000 | Venkatesan et al. | |
| 6,175,850 B1 | 1/2001 | Ishii et al. | |
| 6,366,673 B1 | 4/2002 | Hollmann et al. | 380/28 |
| 6,466,668 B1 | 10/2002 | Miyazaki et al. | |
| 7,073,072 B1 | 7/2006 | Salle et al. | |
| 7,164,765 B2 | 1/2007 | Nishioka et al. | |
| 2002/0039418 A1 | 4/2002 | Dror et al. | |
| 2002/0055962 A1 | 5/2002 | Schroeppel | |
| 2002/0143836 A1 | 10/2002 | Ebergen et al. | |
| 2002/0161810 A1 | 10/2002 | Mellott et al. | |
| 2003/0044014 A1 | 3/2003 | Liardet et al. | |
| 2003/0079139 A1 | 4/2003 | Drexler et al. | |
| 2003/0206629 A1 | 11/2003 | Eberle et al. | 380/30 |
| 2003/0208518 A1 | 11/2003 | Gura et al. | 708/492 |
| 2003/0212729 A1 | 11/2003 | Eberle et al. | 708/625 |
| 2004/0019622 A1 | 1/2004 | Elbe et al. | 708/492 |
| 2004/0066934 A1 | 4/2004 | Chen | 380/30 |
| 2005/0105723 A1 | 5/2005 | Dupaquis et al. | |
| 2006/0282491 A1 | 12/2006 | Joye | |
| 2008/0109501 A1* | 5/2008 | Douguet et al. | 708/250 |

FOREIGN PATENT DOCUMENTS

| | | |
|---|---|---|
| WO | WO-2005050905 A1 | 6/2005 |
| WO | WO-2006124160 A2 | 11/2006 |
| WO | WO-2006124160 A3 | 11/2006 |

OTHER PUBLICATIONS

A. Bosselaers et al., "Comparison of Three Modular Reduction Functions", Advances in Cryptology/ Crypto '93, LNCS 773, Springer-Verlag, 1994, 12 pages.

J.F. Dhem, "Design of an Efficient Public-Key Cryptographic Library for RISC-Based Smart Cards", Doctoral Dissertation, Universite Catholique de Louvain, Louvain-la-Nueve, Belgium, May 1998, 56 pages.

C.H. Lim et al., "Fast Modular Reduction With Precomputation", preprint, 1999 (available from CiteSeer Scientific Literature Digital Library, citeseer.nj. nec.com/109504.html.).

J. Grobschadl, "The Chinese Remainder Theorem and its Application in a High-Speed RSA Crypto Chip", IEEE, 2000, pp. 384-393.

K.C. Posch et al., "Approaching Encryption at ISDN Speed Using Partial Parallel Modulus Multiplication", Microprocessing and Microprogramming, vol. 29, No. 3, 1990, pp. 177-184.

A. Menezes et al., "Efficient Implementation", Handbook of Applied Cryptography, Chapter 14, 1997, pp. 591-635.

B. Dupont de Dinechin, "A Ultra Fast Euclidean Division Algorithm for Prime Memory Systems", Proceedings of 1991 ACM-IEEE Conference on Supercomputing, 1991, pp. 56-65.

"U.S. Appl. No. 10/781,311, Non Final Office Action mailed Jul. 13, 2007", 13 pgs.

"U.S. Appl. No. 10/781,311, Notice of Allowance mailed Mar. 3, 2009", 6 pgs.

"U.S. Appl. No. 10/781,311, Preliminary Amendment mailed Jan. 23, 2009", 3 pgs.

"U.S. Appl. No. 10/781,311, Response filed Oct. 10, 2007 to Non Final Office Action mailed Jul. 13, 2007", 11 pgs.

"U.S. Appl. No. 10/781,311, Response filed Apr. 14, 2008 to Final Office Action mailed Dec. 14, 2007", 10 pgs.

"U.S. Appl. No. 10/781,311, Response filed Aug. 28, 2008 to Non-Final Office Action mailed May 28, 2008", 8 pgs.

"U.S. Appl. No. 10/781,311, Final Office Action mailed Dec. 14, 2007", 11 pgs.

"U.S. Appl. No. 10/781,311, Notice of Allowance mailed Jun. 30, 2009", 7 pgs.

"European Application Serial No. 06749987.1, EP Office Action mailed Oct. 1, 2008", 3 pages.

"European Application Serial No. 06749987.1, European Search Report mailed May 28, 2008", EESR, 21.

"U.S. Appl. No. 10/781,311, Non-Final Office Action mailed May 28, 2008", 6 pgs.

"U.S. Appl. No. 10/781,311, Notice of Allowance mailed Oct. 23, 2008.", 6 pgs.

Bajard, et al., "Arithmetic Operations in the Polynomial Modular Number System", Research Report LIRMM, No. 04030, XP002358296, (Sep. 2004), 1-26.

Barrett, Paul, "Implementing the Rivest Shamir and Adleman public key encryption algorithm on a standard digital signal processor", Proceedings on Advances in cryptology—CRYPTO '86, (Aug. 1986), 311-323.

Chang, Fu-Chi, et al., "Architectural tradeoff in implementing RSA processors", ACM SIGARCH Computer Architecture News, 30(1), (Mar. 2002), 5-11.

Grossschadl, J., "The Chinese Remainder Theorem and Its Application in a High-Speed RSA Crypto Chip", 16th Annual Conference Computer Security Applications, 2000. ACSAC '00., XP010529836. ISBN 0-7695-0859-6, (Dec. 11, 2000), 384-393.

Menezes, Alfred J., et al., "Efficient Implementation—Chapter 14", Handbook of Applied Cryptography, Boca Raton : CRC Press XP002351019 * p. 15-p. 16 * * p. 39-p. 41 *, (1997), 591-635.

Posch, K. C., et al., "Approaching encryption at ISDN speed using partial parallel modulus multiplication", Microprocessing and Microprogramming, 29(3), (1990), 177-184.

"U.S. Appl. No. 10/781,331, Notice of Allowance mailed Nov. 5, 2009", 7 pgs.

"Chinese Application Serial No. 200480033595.5, Office Action (with English translation) mailed Oct. 30, 2009", 5 pgs.

"Chinese Application Serial No. 200480033595.5, Office Action mailed May 22, 2009", 6 pgs.

"Chinese Application Serial No. 200480033595.5, Response filed Sep. 8, 2009 (with English translation) to Office Action mailed May 22, 2009", 4 pgs.

"European Application Serial No. 04800660.5, European Office Action mailed Sep. 28, 2007", 2 pgs.

"European Application Serial No. 04800660.5, Office Action mailed Mar. 3, 2009", 10 pgs.

"European Application Serial No. 04800660.5, Response filed Mar. 20, 2008 to Office Action received Sep. 28, 2007", 13 pgs.

"European Application Serial No. 04800660.5, Supplementary European Search Report mailed Apr. 18, 2007".

"European Application Serial No. 06749987.1, Office Action mailed Sep. 18, 2009", 6 pgs.

"European Application Serial No. 06749987.1, Response filed Apr. 8, 2009 to Extended European Search Report mailed Oct. 1, 2008", 7 pgs.

"International Application Serial No. PCT/US2004/036590, International Search Authority Written Opinion mailed Apr. 19, 2005", 3 pgs.

"International Application Serial No. PCT/US2004/036590, International Search Report mailed Apr. 19, 2005", 1 pg.

"International Application Serial No. PCT/US2006/013795, Search Report mailed Oct. 19, 2007", 1 pg.

Dhem, J- F. et al., "Design of an Efficient Public-Key Cryptographic Library for RISC based", Doctorate of Applied Sciences Thesis, Universite Catholique De Louvain., (May 1998),11-22.

"International Application Serial No. PCT/US2006/013795, Written Opinion of the International Search Authority, mailed Oct. 19, 2007", 4 pgs.

Donald, E. K. "The Art of Computer Programming vol. 2 Seminumerical Algorithm", Third Edition, Addison Wesley, USA, ISBN: 0-20189684-2. (1998), chapter 4.3.2.

Grossschadl, J., "The Chinese Remainder Theorem and Its Application in a High-Speed RSA Crypto Chip", 16th Annual Conference Computer Security Applications, 2000, ACSAC '00., XP010529836. ISBN 0-7695-0859-6, (Dec. 11, 2000), 384-393.

Knuth, Donald E., "Chapter 4.3.2", The Art of Computer Programming, vol. 2 Seminumberical Algorithm, Third Edition, , Addison Wesley, USA, ISBN: 0-201-89684-2, (1998), 284-294.

Morales-Sandoval, M., et al., "On the hardware design of an elliptic curve cryptosystem", *Preceedings of the Fith Mexican International Conference in Computer Science*, 2004, ENC 2004., (2004), 64-70.

Posch, K. C., et al., "Approaching encryption at ISDN spped using partial parallel modulus multiplication", *Microprocessing and Microprogramming*, 29(3), (1990), 177-184.

"International Application Serial No. PCT/US2004/036590, International Search Authority *Written Opinion* mailed Apr. 19, 2005", 3 pgs.

Dhem, J. F et al., "Design of an Efficient Public-Key Cryptographic Library for RISC based Smart Cards", Pages from the *Doctorate of Applied Sciences Thesis*, Universite Cathoiique de Louvain, (May 1998),11-22.

"U.S. Appl. No. 10/781,311, Notice of Allowance mailed Jun. 14, 2010", 8 pgs.

"Chinese Application Serial No. 200480033595.5, Office Action mailed Apr. 13, 2010", 3 Pgs.

"Chinese Application Serial No. 200680020941.5, Office Action mailed May 12, 2010", 3 Pgs.

"European Application Serial No. 04800660.5, Response filed Aug. 17, 2009 to Office Action received May 3, 2009", 10 pgs.

"European Application Serial No. 06749987.1, Response filed May 29, 2010 to Office Action received Sep. 18, 2009", 8 pgs.

\* cited by examiner

RANDOMIZED MODULAR POLYNOMIAL REDUCTION METHOD AND HARDWARE THEREFOR

TECHNICAL FIELD

The invention relates to arithmetic processing and calculating systems and computer-implemented methods, especially for use in cryptography applications. The invention relates in particular to residue arithmetic involving modular reduction of polynomials in a finite field $GF(2^n)$, especially computations derived from the Barrett reduction method.

BACKGROUND ART

Numerous cryptographic algorithms make use of large-integer multiplication (or exponentiation) and reduction of the product to a residue value that is congruent for a specified modulus that is related to the cryptographic key. Some cryptographic algorithms, including the AES/Rijndael block cipher and also those based on discrete logarithms and elliptic curves, perform arithmetic operations on polynomials in a finite field, such as the binary field $GF(2^n)$, including multiplication (or exponentiation) and modular reduction operations on such polynomials. Mathematical computations performed by cryptographic systems may be susceptible to power analysis and timing attacks. Therefore, it is important that computations be secured so that information about the key cannot be obtained.

At the same time, it is important that these computations be fast and accurate. Multiplication and reduction, whether operated upon large integers or upon polynomials in a finite field, is usually the most computationally intensive portion of a cryptographic algorithm. Several distinct computational techniques have been developed for efficient modular reduction, including those known as the Quisquater method, the Barrett method and the Montgomery method, along with modifications involving pre-computation and table look-up. These well-known techniques are described and compared in the prior art. See, for example: (1) A. Bosselaers et al., "Comparison of three modular reduction functions", Advances in Cryptology/Crypto '93, LNCS 773, Springer-Verlag, 1994, pp. 175-186. (2) Jean François Dhem, "Design of an efficient public-key cryptographic library for RISC-based smart cards", doctoral dissertation, Université catholique de Louvain, Louvain-la-Neuve, Belgium, May 1998. (3) C. H. Lim et al., "Fast Modular Reduction With Precomputation", preprint, 1999 (available from CiteSeer Scientific Literature Digital Library, citeseer.nj.nec.com/109504.html). (4) Hollmann et al., "Method and Device for Executing a Decrypting Mechanism through Calculating a Standardized Modular Exponentiation for Thwarting Timing Attacks", U.S. Pat. No. 6,366,673 B1, Apr. 2, 2002 (based on application filed Sep. 15, 1998).

An objective of the present invention is to provide an improvement of the Barrett modular reduction method and corresponding computing apparatus, especially as applied to polynomials, which is more secure against cryptoanalysis attacks, while still providing fast and accurate results.

Another objective of the present invention is to provide the aforementioned improved method and apparatus which speeds up quotient estimation for use in the modular reduction of polynomials.

DISCLOSURE OF THE INVENTION

These objects are met by a computer-implemented method for modular reduction of polynomials in a binary finite field $GF(2^n)$ in which a polynomial quotient used for the reduction computation is estimated (to at least the correct polynomial degree) using a precomputed scaled inverse of the polynomial modulus as a multiplier. The polynomial remainder resulting from the reduction is always congruent to the corresponding intermediate product relative to the specified irreducible polynomial modulus of degree n, but is typically larger (in terms of polynomial degree) than the minimal residue value and differs in a random manner for each execution. Because the estimation error is deliberately randomized, the method is more secure against cryptoanalysis. Yet the intermediate results are mathematically equivalent (congruent to the true results), and a final result may be obtained by processing a final strict reduction without randomization, thus achieving the accuracy needed for the invertibility of cryptographic operations.

The hardware used to execute the method steps of the invention includes a random number generator to inject random error into the quotient estimation. A computation unit with memory access operates under the control of an operation sequencer executing firmware to carry out the word-wide multiply-accumulate steps of multi-word polynomial multiplication and modular reduction. The computation unit may include multiply-accumulate hardware dedicated to finite field polynomial operations, or may be selectable to perform either natural or polynomial arithmetic.

BEST MODE OF CARRYING OUT THE INVENTION

Figure 1:
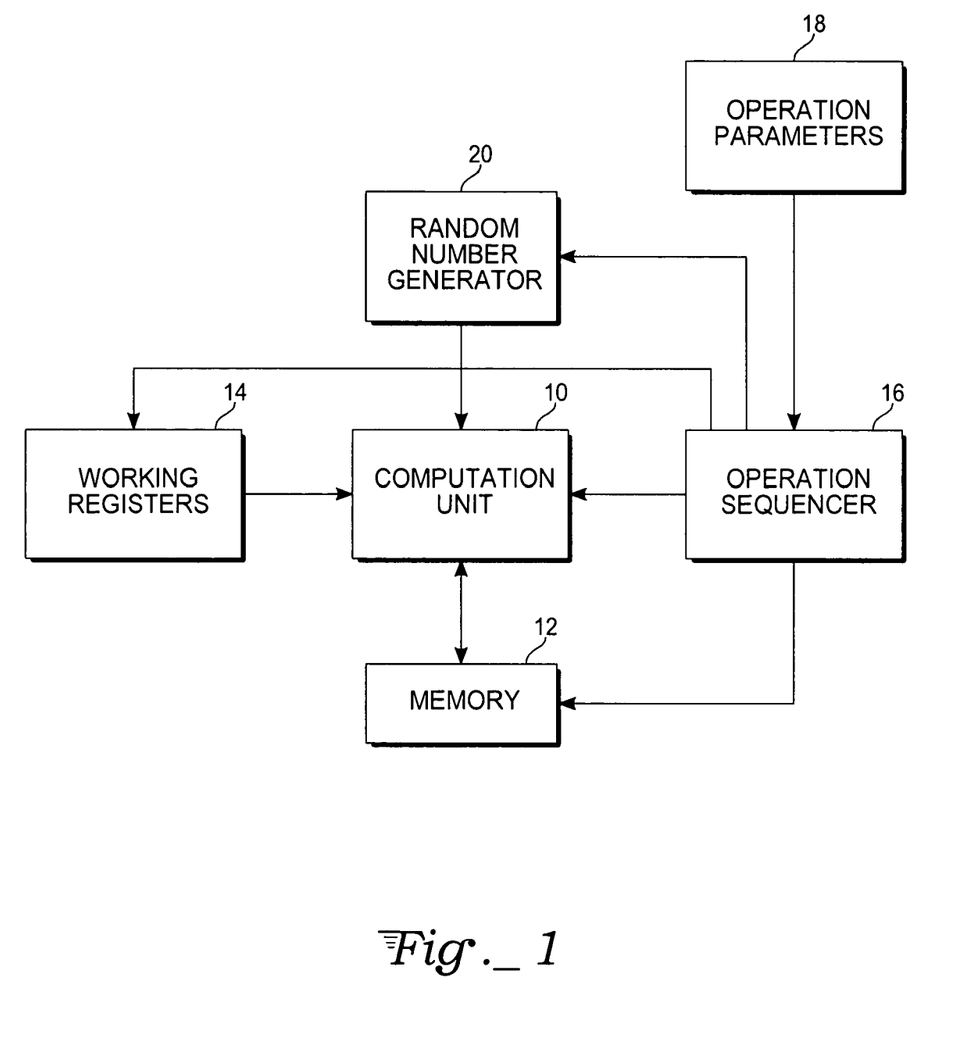
FIG. 1 is a schematic plan view of computational hardware in accord with the present invention (including a random number generator unit), which is used to execute the modular reduction method of the present invention.

With reference to FIG. 1, computational hardware includes a computation unit 10 that is able to perform word-wide finite field multiply and multiply-accumulate steps on polynomial operands retrieved from memory (RAM) 12 and working registers 14. Registers 14 may be the same hardware registers that would be responsible for carry injection in normal integer operations. An operation sequencer 16 comprises logic circuitry for controlling the computation unit 10 in accord with firmware or software instructions for the set of operations to carry out the multi-word finite field polynomial multiplication (or exponentiation) and the modular reduction using an irreducible polynomial basis. The operation parameters, stored in registers 18 accessible by the operation sequencer 16, consist in pointers that enable the operation sequencer to locate an operand within the RAM 12, as well as information about the lengths (number of words) of the operands and the destination address of the intermediate results.

As so far described, the apparatus is substantially similar to other available hardware adapted for multi-word polynomial arithmetic operations. Polynomial arithmetic carried out in the binary finite field $GF(2^n)$ differs from natural arithmetic in ignoring carries and in the equivalence of addition and subtraction. The computation unit may include multiply-accumulate hardware dedicated to finite field polynomial operations, or may be dual-purpose natural/polynomial arithmetic hardware that can be selected to perform either natural or polynomial arithmetic. Other than the details of the reduction steps, which will be described below, the firmware or software instructions are also similar to prior programs for executing efficient multi-word polynomial multiplication or exponentiation in word-wide segments.

Unlike prior hardware of this type, the hardware in FIG. 1 also includes a random number generator 20, which for example can be any known pseudo-random number generator circuit. The random number generator performs a calculation and outputs a random number whose bits are interpreted as the binary coefficients of a random polynomial to be used in the present method. Here, the random number generator 20 is accessed by the computation unit 10, as directed by the operation sequencer 16 in accord with the program instructions implementing the method of the present invention, in order to inject the randomized error quantity into the quotient estimation, as described below.

Figure 2:
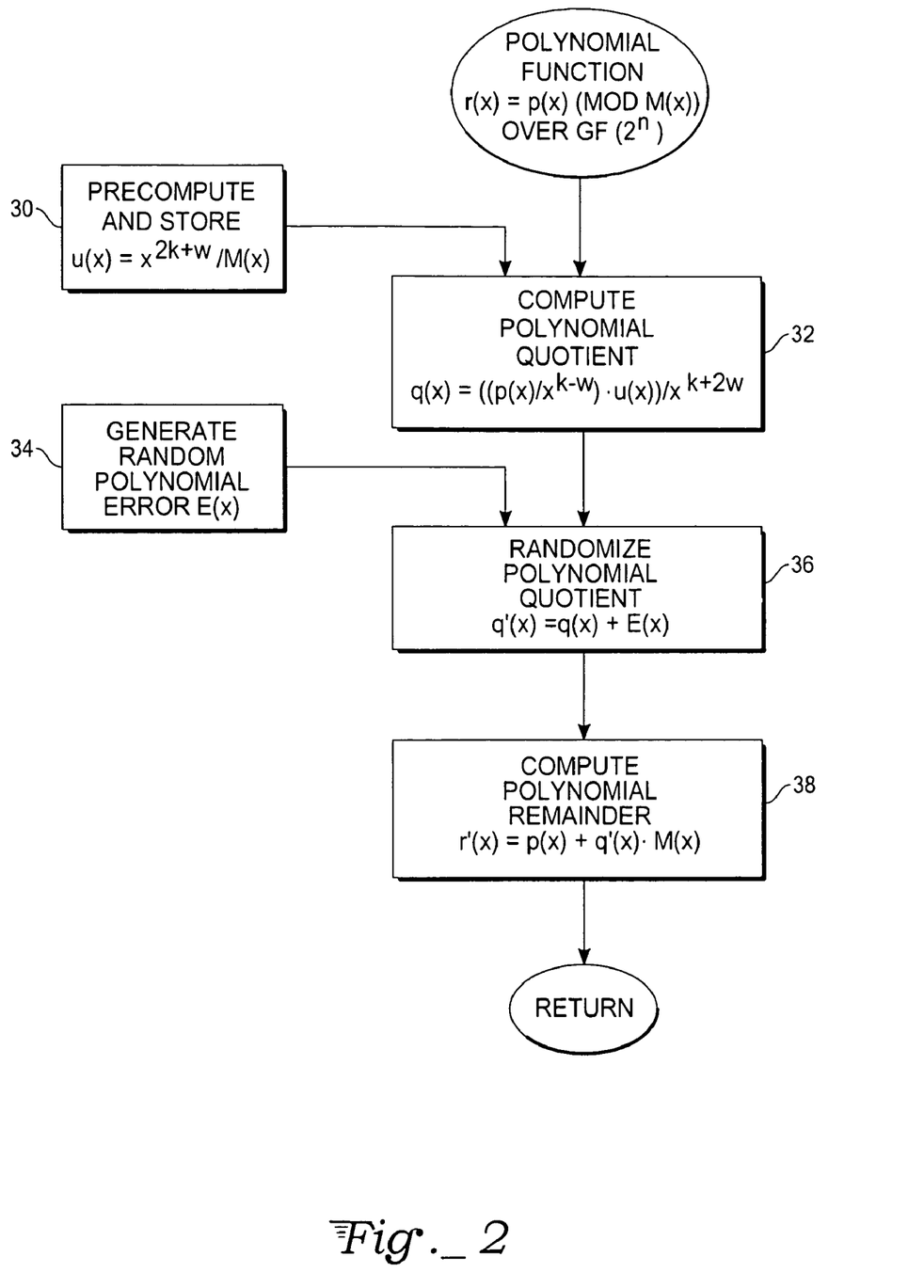
FIG. 2 is a flow diagram illustrating the general steps in the present modular reduction method.

With reference to FIG. 2, the method of the present invention is an improvement of the Barrett modular reduction technique, providing faster quotient estimation and resistance to cryptoanalytic attack, and applies the modular reduction technique to polynomials in the binary finite field $GF(2^n)$. The method is executed by the hardware in FIG. 1.

Modular arithmetic with polynomials is similar in some respects to modular arithmetic with integers, although extending this to polynomials over a binary finite field $GF(2^n)$ requires certain modifications to the basic operation. Let us first introduce polynomials over a field. To any multiple $(a_{m-1}, \ldots a_1, a_0)$ of members of a field F, we can associate a polynomial in x of degree (m–1): $a_{m-1}x^{m-1}+\ldots a_1x^1+a_0x^0$. In the case of any binary finite field, the members of the field are $\{0, 1\}$ and so the polynomial coefficients $a_i$ are likewise 0 or 1. This concept adapts particularly well to computer hardware, which is binary in nature, since each bit can be interpreted as a finite field element. For example, we can associate each binary byte value $[a_7\ a_6\ a_5\ a_4\ a_3\ a_2\ a_1\ a_0]$ with a corresponding polynomial over $GF(2^n)$ of degree 7 (or less): $a_7x^7 + a_6x^6+a_5x^5+a_4x^4+a_3x^3+a_2x^2+a_1x+a_0$. Hence, e.g., the byte value [01100011] is interpreted as the binary polynomial $x^6+x^5+x+1$. Longer multi-byte sequences may likewise be interpreted as polynomials of higher degree, provided that, over the binary finite field $GF(2^n)$, the polynomial degree (m–1) is less than n, in order for the polynomial to belong to that field. (Note: when comparing the relative sizes of polynomial, the comparison is performed degree by degree, starting with the polynomial coefficients for the largest degree in x.) Addition and subtraction of polynomials in a field are carried out in the usual manner of adding or subtracting the coefficients for each degree separately, $$\sum_i a_i x^i \pm \sum_i b_i x^i = \sum_i (a_i \pm b_i) x^i$$

However, for any binary field, the members are $\{0,1\}$, so that addition and subtraction of the field elements is performed modulo 2 ($0\pm0=0$, $0\pm1=1\pm0=1$, $1\pm1=0$). Note that, in this case, subtraction is identical to addition. In computer hardware, addition/subtraction modulo 2 is performed with a logical XOR operation upon the array of the bits. For example, $(x^6+x^4+x^2+x\ 1)+(x^7+x+1)=(x^7+x^6+x^4+x^2)$; or in binary notation [01010111]⊕[10000011]=[11010100]. Polynomial multiplication is ordinarily defined (for infinite fields) by:

$$\left(\sum_i a_i x^i\right) \cdot \left(\sum_j b_j x^j\right) = \sum_k c_k x^k,$$

where the coefficient $c_k$ is given by the convolution:

$$c_k = \sum_{i+j=k} a_i b_j.$$

(Again, in a binary field, the summation is performed modulo 2.)

However, in a finite field, this definition must be modified in order to ensure that the product also belongs to the field. In particular, ordinary polynomial multiplication is followed by modular reduction by a modulus m(x) of degree n (where n is the dimension of the finite field, as in $GF(2^n)$. The modulus m(x) is preferably chosen to be an irreducible polynomial (the polynomial analogue of a prime number, i.e. one that cannot be factored into nontrivial polynomials over the same field.) For example, in the AES/Rijndael symmetric block cipher, operations are performed on bytes (polynomials of degree 7 or less) in the binary finite field $GF(2^8)$, using the particular irreducible polynomial $m(x)=x^8+x^4+x^3+x+1$ as the chosen basis for modular reduction when performing polynomial multiplication. As an example of polynomial multiplication in a binary finite field using the particular m(x) specified for AES: $(x^6+x^4+x^2+x+1)\cdot(x^7+x+1)=(x^{13}+x^{11}+x^9+x^8+x^6+x^5+x^4+x^3+1)$, which after reduction, gives $(x^7+x^6+1)$.

Let F[x] be the set of polynomials all of whose coefficients are members of a field F. If the modulus m(x) is a polynomial of degree d in F[x], then for polynomials p(x), r(x)∈F[x], we say that p(x) is congruent to r(x) modulo m(x), written as $p(x)\equiv r(x)\ (\text{mod}\ m(x))$, if and only if m(x) divides the polynomial p(x)–r(x); in other words p(x)–r(x) is a polynomial multiple of m(x), that is, $p(x)-r(x)=q(x)\cdot m(x)$ for some polynomial q(x)∈F[x].

Equivalently, p(x) and r(x) have the same remainder upon division by m(x). Modular reduction of a polynomial p(x), which could be an ordinary product of polynomials a(x) and b(x) in F[x], i.e. $p(x)=a(x)\cdot b(x)$, involves finding a polynomial quotient q(x) such that the remainder or residue r(x) is a polynomial of degree less than m(x), i.e., deg(r(x))<d. The polynomial residue r(x), which is congruent with p(x), is the polynomial value we ultimately want. In the binary finite field $GF(2^n)$, m(x) will be an irreducible polynomial of degree n and the residue polynomial r(x) that is sought will be of degree less than n; but p(x) and hence also q(x) can be any degree, and at least the polynomial p(x) to be reduced is often of degree larger than m, as for example when p(x) is a product. In any case, the basic problem in any modular reduction method is in efficiently obtaining a quotient, especially for polynomial p(x) and m(x) of large degree. In the context of cryptographic applications, an additional problem is in performing the reduction operation in computational hardware in a way that is secure from power analysis attacks.

Barrett's method, originally devised for integer reduction operations, involves pre-calculating and storing a scaled estimate of the modulus' reciprocal, U, and replacing the long division with multiplications and word or bit shifts (dividing by x) in order to estimate the quotient. With appropriate choice of parameters, the error in the quotient estimate is at most two. The present invention adapts Barrett's method to modular reduction of polynomial in a binary finite field and also improves upon Barrett's method with a faster estimation of the quotient and by intentionally injecting a random error into the quotient prior to computing the remainder. The resulting randomized remainder will be slightly larger than (in terms of polynomial degree), but congruent with, the residue value.

Let k be the size of the polynomial modulus m(x) in degree, where $$m(x) = \sum_{i=0}^{k} x^i, \text{ with}$$

$$m_k = 1, m_i \in \{0,1\} \text{ for } k-1 \geq i \geq 0$$

and let p(x) be the polynomial to be reduced, up to a degree l, where $$p(x) = \sum_{j=0}^{l} p_j \cdot x^j, \text{ with}$$

$$p_j \in \{0,1\} \text{ for } l \geq j \geq 0$$

$$\deg(p(x)) \leq 2 \cdot k + 1$$

We begin by precomputing and storing (step 30 in FIG. 2) a constant polynomial u(x) representing the scaled reciprocal of the modulus m(x)

$$u(x) = x^{2k+1}/m(x)$$

This stored value is then subsequently used in all polynomial reduction operations for this particular modulus m(x). u(x) is always of degree k for every modulus m(x) that is not a simple power of x.

To perform a modulo reduction of p(x), we estimate a polynomial quotient q(x) (step 32) using the stored value u(x):

$$q(x) = ((p(x)/x^{k-1}) \cdot u(x))/x^{k+2}$$

For a modulus m(x) of high degree (multi-word), the operation can be performed with word shifts rather than bit shifts. With a word size w, we can define $u(x) = x^{2k+w}/m(x)$ and estimate a quotient $q(x) = ((p(x)/x^{k-w}) \cdot u(x))/x^{k+2w}$. In this case, the polynomial p(x) can have a slightly larger degree: $\deg(p(x)) \leq 2 \cdot k + w$. This simplifies handling of the polynomial quantities in the computational hardware. This computation requires only binary finite field polynomial multiplications (without reduction) and shifts of polynomial degree.

At this stage (step 36), a random polynomial error E(x) is injected into the computed polynomial quotient to obtain a randomized quotient, q'(x) = q(x) + E(x). The random polynomial error E(x) may be generated (step 34) by any known random or pseudo-random number generator (hardware or software), where the binary value generated is interprets as a polynomial in the manner already described above. The only constraint is that the polynomial degree of the error fall within a specified range, such as $$0 \leq \deg(E(x)) < w/2$$

For a modulus m(x) of high degree (multi-word), the error should be limited to a few bits, e.g., less than half a word, i.e., deg(E(x))<w/2. This limits the potential error contributed by the random generator to a specified number of bits, e.g. half a word, in addition to any error arising from the quotient estimation itself.

Next, we compute (step 38) the remainder r'(x), which will be congruent (modulo m(x)) with the residue value r(x):

$$r'(x) = p(x) + q'(x) \cdot m(x)$$

Because a random polynomial error E is introduced into the polynomial quotient q(x), the calculated remainder r'(x) will be slightly larger in degree than the modulus m(x).

The remainder r'(x) can be used in further calculations, the result of which if necessary may again be reduced. (The error remains bounded.)

Alternatively, depending upon the needs of the particular application, the residue r(x) can be calculated from the remainder r'(x) by applying ordinary GF($2^n$) polynomial reduction with the modulus m(x) to obtain a polynomial value smaller than m(x).

Randomizing the modular reduction provides security against various cryptanalytic attacks that rely upon consistency in power usage to determine the modulus. Here, the binary field polynomial reduction of p(x) modulo m(x) varies randomly from one execution to the next, while still producing an intermediate remainder r'(x) that is congruent. The sequence of binary field polynomial reduction at the end to generate a final residue value r(x) also varies randomly from one execution to the next because it operates upon different remainders r'(x). The polynomial p(x) to be reduced in this way can be obtained from a variety of different arithmetic operations, including multiplication, squaring, exponentiation, addition, etc. Likewise, the modulus m(x) to be used can be derived in a variety of ways, most usually in cryptography from a key. The randomized modular reduction method of the present invention is useful in many cryptographic algorithms that rely upon such binary field GF($2^n$) polynomial reductions, including the Rijndael/AES symmetric block cipher, as well as discrete logarithm-based public-key cryptography systems.

What is claimed is:

1. A cryptographically secure, computer hardware-implemented modular polynomial reduction method in the binary finite field GF($2^n$), comprising:
   precomputing and storing in memory a polynomial constant u(x) representing a bit-scaled reciprocal of a polynomial modulus m(x);
   estimating an approximate polynomial quotient q for a polynomial p(x) to be reduced modulo m(x), wherein said estimating is executed upon p(x) in a computation unit by a polynomial multiplication over GF($2^n$) said constant u(x) and by bits shifts;
   generating in a random number generator a random polynomial error value E(x) and applying said polynomial error value to said approximate polynomial quotient to obtain a randomized polynomial quotient q'(x) = q(x) + E(x); and
   calculating a polynomial remainder r'(x) = p(x) + q'(x) · m(x) in said computation unit, said remainder r'(x) being of high degree than said modulus m(x) but congruent to p(x) modulo m(x) and where the degree of p(x) is less than or equal to 2k+1.

2. The method of claim 1 wherein precomputing said polynomial constant u(x) is performed according to the equation $u(x) = x^{2k+w}/m(x)$.

3. The method of claim 2 wherein estimating the quotient q(x) is performed by the computation unit according to the equation $q(x) = ((p(x)/x^{k-1}) \cdot u(x))/x^{k+2}$.

4. The method of claim 1 wherein said bit shifts are word-size shifts, the polynomial constant is precomputed as $u(x) = x^{2k+w}/m(x)$ and the quotient is estimated as $q(x) = ((p(x)/x^{k-w}) \cdot u(x))/x^{k+2w}$, where w is the word size in bits, and where the degree of p(x) is less than or equal to 2k+w.

5. The method of claim 4 wherein the random number generator has a specified error limit of one-half word, whereby $0 \leq \deg(E(x)) < w/2$.

6. The method of claim 1 wherein the modular reduction of p(x) is part of a computer hardware-implemented cryptography program.

7. Computational hardware for executing a cryptographically secure polynomial modular reduction method over a binary finite field GF ($2^n$), the hardware comprising:

a computation unit adapted to perform word-wide finite-field multiply and accumulate steps on polynomial operands retrieved from a memory and polynomial coefficient intermediate results from a set of working registers;

a random number generator for generating a random polynomial error value E(x);

an operations sequencer comprising logic circuitry for controlling the computation unit and random number generator in accord with program instructions so as to carry out a polynomial modular reduction of a number p(x) with respect to a modulus m(x) over a binary finite field GF ($2^n$) that involves at least an estimation of a polynomial quotient q(x) from a pre-stored polynomial constant u(x) representing a bit-scaled reciprocal of the modulus, a randomization of said the approximate polynomial quotient with said random polynomial error value E(x) to obtain a randomized polynomial quotient q'(x)=q(x)+E(x), and a calculation of a polynomial remainder value r'(x)=p(x)+q'(x)·m(x).

8. The computation hardware of claim 7 further comprising operation parameter registers accessible by said operations sequencer, said registers containing any one or more of (a) pointers for locating word-size coefficients of polynomial operands within said memory or working registers, (b) information about word lengths of polynomial operands, and (c) destination address information for intermediate results of operation steps.

9. The computation hardware of claim 7 wherein the pre-stored polynomial constant u(x) in said memory is obtained from a precomputation according to the equation u(x)= $x^{2k+w}$/m(x), with w being the word size of the computation unit in bits.

10. The computation hardware of claim 9 wherein the estimation of said approximate polynomial quotient q performed by said computation unit under control of said operations sequencer carrying out program instructions is done according to the equation $$q'(x)=((p(x) \cdot x^{k-w}) \cdot u(x))/x^{k+2w}.$$

11. The computation hardware of claim 10 wherein the random number generator has a specified error limit of one-half word, whereby $0 \leq \deg(E(x)) < w/2$.

* * * * *

UNITED STATES PATENT AND TRADEMARK OFFICE
CERTIFICATE OF CORRECTION

PATENT NO. : 7,805,480 B2
APPLICATION NO. : 11/203939
DATED : September 28, 2010
INVENTOR(S) : Vincent Dupaquis et al.

It is certified that error appears in the above-identified patent and that said Letters Patent is hereby corrected as shown below:

On page 2, under "Other Publications", in column 2, line 27, delete "10/781,331," and insert -- 10/781,311, --, therefor.

On page 2, under "Other Publications", in column 2, line 70, delete "Seminumberical" and insert -- Seminumerical --, therefor.

On page 3, under "Other Publications", in column 1, line 2, delete "Preceedings" and insert -- proceedings --, therefor.

On page 3, under "Other Publications", in column 1, line 2, delete "Fith" and insert -- Fifth --, therefor.

On page 3, under "Other Publications", in column 1, line 4, delete "spped" and insert -- speed --, therefor.

On page 3, under "Other Publications", in column 1, line 12, delete "Cathoiique" and insert -- Catholique --, therefor.

On page 3, under "Other Publications", in column 2, line 8, delete "May 3," and insert -- March 3, --, therefor.

On page 3, under "Other Publications", in column 2, line 9, delete "May" and insert -- March --, therefor.

In column 3, line 65, delete "$(x^6+x^4+x^2+x\ 1)$" and insert -- $(x^6+x^4+x^2+x+1)$ --, therefor.

In column 5, line 11, delete "$x^i$," and insert -- $m_i \cdot x^i$, --, therefor.

In column 5, line 26, delete "$u(x)=x^{2k+1/}m(x)$" and insert -- $u(x)=x^{2k+1}/m(x)$ --, therefor.

Signed and Sealed this
Twenty-ninth Day of March, 2011

David J. Kappos
*Director of the United States Patent and Trademark Office*

CERTIFICATE OF CORRECTION (continued)
U.S. Pat. No. 7,805,480 B2

In column 8, line 24, in Claim 11, delete "(E(x)<w/2." and insert -- $(E(x))<w/2.$ --, therefor.